(12) United States Patent
Wang et al.

(10) Patent No.: US 6,991,380 B2
(45) Date of Patent: Jan. 31, 2006

(54) WHEELEND ASSEMBLY WITH DETACHABLE OUTBOARD JOINT

(75) Inventors: Hui Hugh Wang, Ann Arbor, MI (US); Douglas Charles Myers, Canton, MI (US); Michael Walter Hopson, Clinton Township, MI (US); Paul Eugene Beshears, Jr., Plymouth, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 173 days.

(21) Appl. No.: 10/670,496

(22) Filed: Sep. 24, 2003

(65) Prior Publication Data

US 2005/0063628 A1 Mar. 24, 2005

(51) Int. Cl.
*F16C 19/36* (2006.01)

(52) U.S. Cl. .................................. 384/544; 384/903
(58) Field of Classification Search ............ 384/589, 384/544, 903; 464/145, 178, 904, 906; 301/105.1; 411/517, 520, 521; 403/325, 326, 315–317
See application file for complete search history.

(56) References Cited

U.S. PATENT DOCUMENTS

| | | | |
|---|---|---|---|
| 1,966,826 A | 7/1934 | Miller | |
| 4,004,838 A | 1/1977 | Savage | |
| 4,629,028 A | 12/1986 | Krude et al. | |
| 5,486,053 A | 1/1996 | Beagley et al. | |
| 5,536,075 A | 7/1996 | Bertetti | |
| 5,549,514 A | 8/1996 | Welschof | |
| 6,022,275 A | 2/2000 | Bertetti | |
| 6,152,825 A | 11/2000 | Doell | |
| 6,170,628 B1 | 1/2001 | Bigley | |
| 6,193,419 B1 * | 2/2001 | Krude et al. | 384/544 |
| 6,196,639 B1 | 3/2001 | Di Ponio et al. | |
| 6,299,360 B1 * | 10/2001 | Dougherty et al. | 384/584 |
| 6,354,952 B1 * | 3/2002 | Boulton et al. | 464/145 |
| 6,450,585 B1 | 9/2002 | Kochsiek | |
| 6,749,517 B2 * | 6/2004 | Ouchi | 464/178 |
| 6,851,866 B2 * | 2/2005 | Kayama et al. | 384/584 |
| 2002/0106140 A1 | 8/2002 | Uchman | |

* cited by examiner

Primary Examiner—Thomas R. Hannon
(74) Attorney, Agent, or Firm—Brinks Hofer Gilson & Lione

(57) ABSTRACT

A wheel end assembly includes a bearing shaft having an inboard end and an outboard end. A wheel hub is mounted onto the outboard end of the bearing shaft, and a detachable outboard joint is mounted onto the inboard end of the bearing shaft. A wheel bearing is mounted onto the bearing shaft between the inboard end and the outboard end. The inboard end of the bearing shaft includes a flange portion that provides a support to keep the wheel bearing positioned onto the bearing shaft and induces a pre-load into the wheel bearing such that the pre-load is maintained on the wheel bearing when the outboard joint is removed from the wheel end assembly.

26 Claims, 6 Drawing Sheets

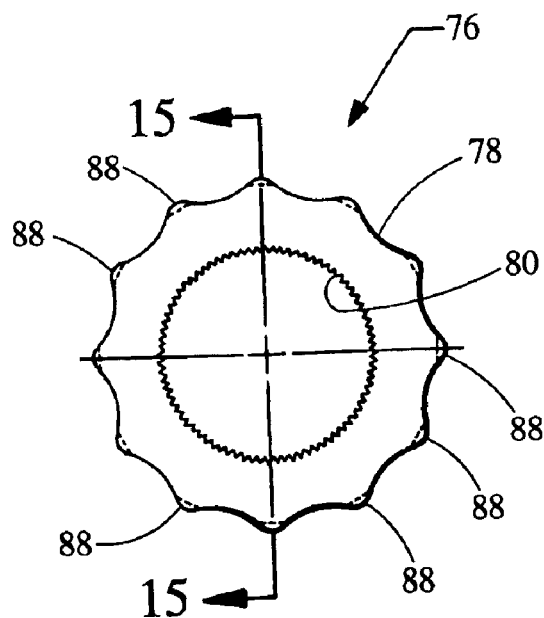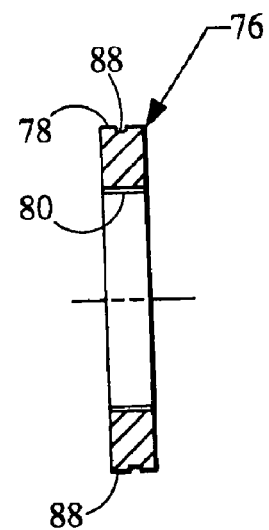
Fig. 14  Fig. 15
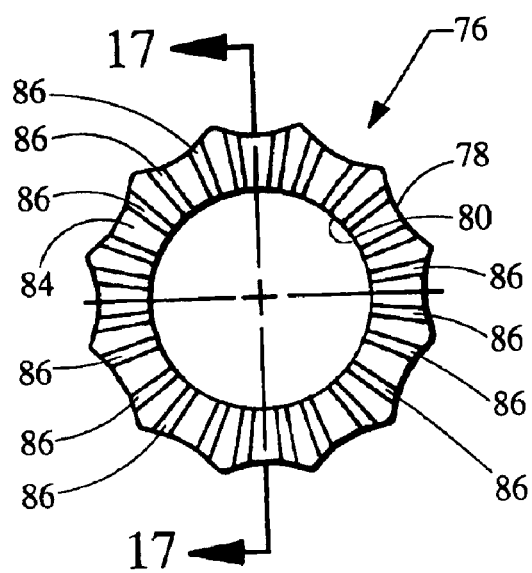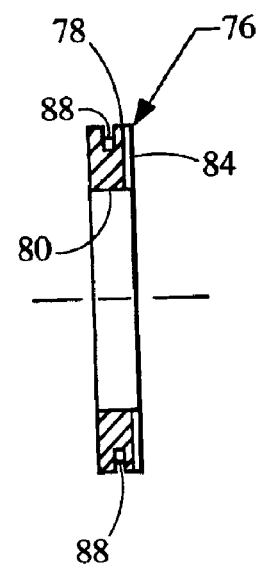
Fig. 16  Fig. 17

WHEELEND ASSEMBLY WITH DETACHABLE OUTBOARD JOINT

FIELD OF INVENTION

The invention relates to a wheel end assembly for a motor vehicle that features a self retained, pre-loaded wheel bearing and a detachable outboard joint which can be removed from the wheel end assembly without allowing the wheel bearing to come apart.

BACKGROUND OF THE INVENTION

In current wheel end designs, an outboard joint includes a stem that is inserted into a hub to transmit rotational power across the wheel end assembly. In these designs, the wheel bearing is not self-retained. Therefore, if the outboard joint is removed from the wheel end assembly, the wheel bearing inner race may separate from the bearing assembly. Additionally, these designs do not eliminate backlash, and therefore, the loads that they can transmit are limited.

Accordingly, there is a need for a wheel end assembly featuring a self retained wheel bearing and a detachable outboard joint, wherein the outboard joint can be removed from the wheel end assembly leaving the wheel bearing intact.

BRIEF SUMMARY OF THE INVENTION

In meeting the above need and in over coming the limitations of the known designs a wheel end assembly is provided having a bearing shaft with an inboard end and an outboard end. A wheel hub is mounted onto the outboard end and a detachable outboard joint is mounted onto the inboard end. Mounted onto the bearing shaft between the inboard end and the outboard end is a wheel bearing. The inboard end includes a flange portion that supports the wheel bearing on the bearing shaft and induces a pre-load into the wheel bearing such that the pre-load is maintained on the wheel bearing when the outboard joint is removed from the wheel end assembly.

In one aspect the wheel bearing includes a knuckle flange that is adapted to connect the wheel end assembly within a vehicle. The knuckle flange has an inner diameter that defines an inboard outer race and an outboard outer race. The bearing shaft supports an inboard inner race and an outboard inner race. A plurality of bearing elements are positioned between the knuckle flange and the bearing shaft with a first portion of the bearing elements being positioned between the inboard outer race and the inboard inner race and a second portion of the bearing elements being positioned between the outboard outer race and the outboard inner race. The flange portion of the bearing shaft engages the inboard inner race to support the wheel bearing and induces a pre-load into the wheel bearing.

In another aspect, the outboard joint includes a bell housing having a narrowed neck portion that defines a bell housing inner surface having a polygon shape. The bearing shaft includes an outer surface at the inboard end having a polygon shape corresponding to the bell housing inner diameter. The bell housing engages the bearing shaft and rotationally locks the bell housing and the bearing shaft to one another.

In yet another aspect, the polygonal shaped bell housing inner surface and the polygonal shaped outer surface of the bearing shaft are tapered along a longitudinal axis of the wheel end assembly.

In a further aspect, the polygon shaped outer surface of the bearing shaft is formed within the flange portion of the bearing shaft.

In yet another aspect, the polygon shaped outer surface of the bearing shaft is formed within a ring that is mounted on the bearing shaft. The ring includes a splined inner diameter that engages the outer diameter of the bearing shaft such that the ring is rotationally locked onto the bearing shaft.

In still another aspect, the ring includes an inboard face having a plurality of axial extending ridges, wherein the flange portion of the bearing shaft engages the axially extending ridges such that the ring is rotationally locked onto the bearing shaft.

Additional features, benefits, and advantages will become apparent to those skilled in the art to which the invention relates, from a review of the subsequent description and the appended claims, taken in conjunction with the accompanying drawings.

BRIEF DESCRIPTION OF THE DRAWINGS

FIG. 14 is a top view of a ring of the wheel end assembly shown in FIG. 13;

FIG. 15 is a side sectional view taken along line 15–15 of FIG. 14;

FIG. 16 is a top view of a ring having axial ridges;

FIG. 17 is a side sectional view taken along line 17—17 of FIG. 16;

DETAILED DESCRIPTION OF THE INVENTION

Figure 1:
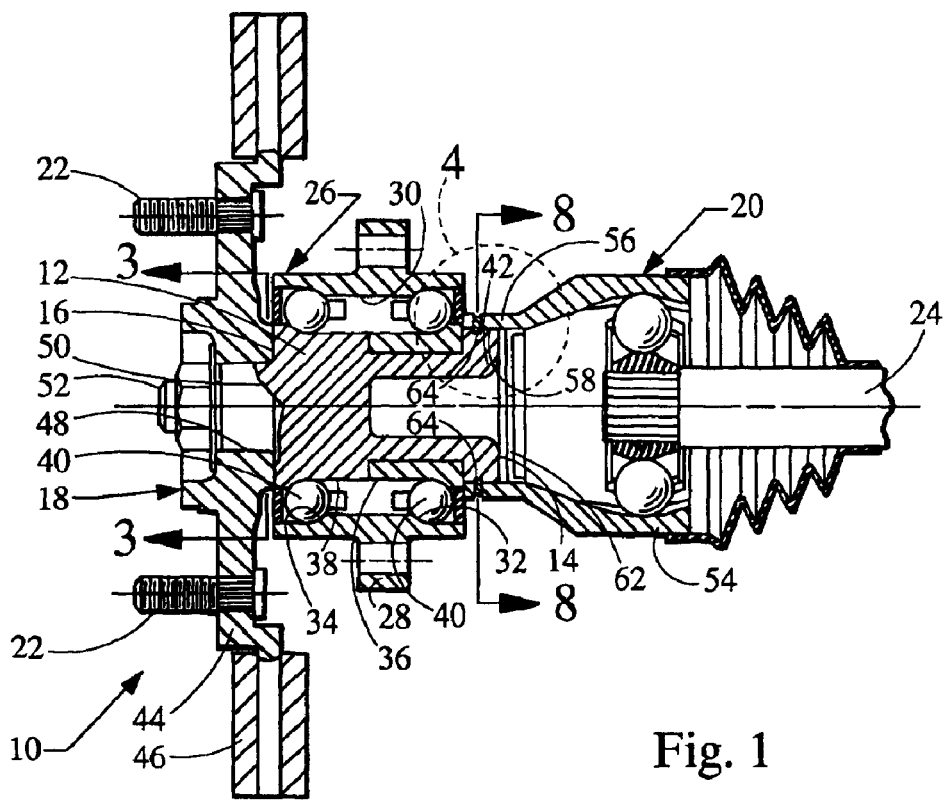
FIG. 1 is a side sectional view of a wheel end assembly.

Referring to FIG. 1, a wheel end assembly for a motor vehicle is shown generally at 10. The wheel end assembly 10 includes a bearing shaft 12 having an inboard end 14 and an outboard end 16. A wheel hub 18 is mounted to the outboard end 16 of the bearing shaft 12 and a detachable outboard joint 20 is mounted onto the inboard end 14 of the bearing shaft 12.

A plurality of wheel studs 22 extend from the wheel hub 18. The wheel studs 22 are adapted to engage a wheel (not shown) and support the wheel on the wheel hub 18. The outboard joint 20 connects an axle half shaft 24 to the wheel end assembly 10 such that rotational movement is transferred through the axle half shaft 24 to the wheel end assembly 10. The outboard joint 20 is a joint that is adapted to allow angular deflection between the wheel end assembly 10 and the axle half shaft 24, such as a constant velocity joint.

A wheel bearing 26 is mounted on the bearing shaft 12, between the inboard end 14 and the outboard end 16, to rotatably support the wheel end assembly 10 on the structure (not shown) of the vehicle. The wheel bearing 26 includes a knuckle attachment flange 28 that is adapted to connect the wheel end assembly 10 to the knuckle structure (not shown) of the vehicle. The knuckle attachment flange 28 has an inner diameter 30 that defines an inboard outer race 32 and an outboard outer race 34.

Figure 2:
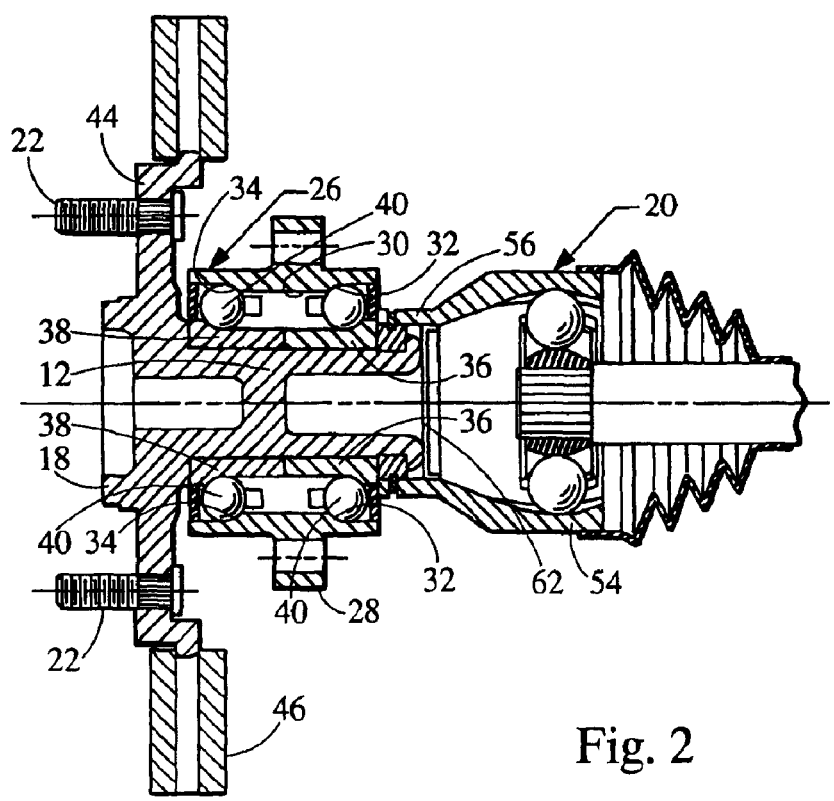
FIG. 2 is a side sectional view, similar to FIG. 1, of a variation of the wheel end assembly.

The bearing shaft 12 supports an inboard inner race 36 and an outboard inner race 38. A shown in FIG. 1, the inboard inner race 36 is a separate component mounted onto the bearing shaft 12 and the outboard inner race 38 is integrally formed within the bearing shaft 12. Alternatively, the outboard inner race 38 can also be a separate component mounted onto the bearing shaft 12, as shown in FIG. 2.

A plurality of bearing elements 40 are positioned within the wheel bearing 26. A first portion of the bearing elements 40 are positioned between the inboard outer race 32 and the inboard inner race 36 and a second portion of the bearing elements 40 are positioned between the outboard outer race 34 and the outboard inner race 38. The bearing elements 40 allow the bearing shaft 12 to rotate relative to the knuckle attachment flange 28, thereby rotatably supporting the wheel end assembly 10 within the vehicle. The bearing elements 40 can be ball bearings, tapered bearings, or other suitable bearing elements, depending on the particular application.

The inboard end 14 of the bearing shaft 12 includes a flange portion 42. The flange portion 42 engages the inboard inner race 36 to provide a support for the wheel bearing 26 thereby keeping the wheel bearing 26 positioned on the bearing shaft 12 and inducing a pre-load into the wheel bearing 26. The flange portion 42 is formed by swagging a portion of the bearing shaft 12 over and against the wheel bearing 26. The flange portion 42 maintains a pre-load on the wheel bearing 26 when the outboard joint 20 is removed from the wheel end assembly 10.

As shown in FIG. 1, the wheel hub 18 includes a brake rotor 44 having a braking ring 46 mounted thereon. As illustrated, the braking ring 46 and the brake rotor 44 are integrally formed with one another.

Figure 3:
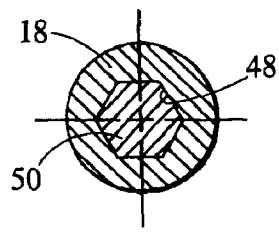
FIG. 3 is a sectional view taken along line 3—3 of FIG. 1.

Referring to FIG. 3, the wheel hub 18 includes a polygonal shaped inner bore 48 and the outboard end 16 of the bearing shaft 12 includes a correspondingly shaped polygonal hub 50 extending therefrom. The polygonal hub 50 of the bearing shaft 12 fits within the polygonal shaped bore 48 of the wheel hub 18 to rotationally lock the wheel hub 18 to the bearing shaft 12. A threaded fastener 52 axially secures the wheel hub 18 to the bearing shaft 12. Alternatively, the wheel hub 18 and the bearing shaft 12 can be integrally formed with one another as a single component, as shown in FIG. 2.

The outboard joint 20 includes a bell housing 54 having a narrowed neck portion 56 defining a bell housing inner surface 58. The bell housing inner surface 58 has a polygon shape and the bearing shaft 12 presents an outer surface 60 at the inboard end 14 that has a corresponding polygon shape. The bell housing inner surface 58 engages the bearing shaft outer surface 60 and is rotationally locked to the bearing shaft 12. A seal 62 prevents contamination from entering the constant velocity joint. As illustrated, the polygon shape of the bearing shaft outer surface 60 is formed within the flange portion 42 of the bearing shaft 12.

Figure 5:
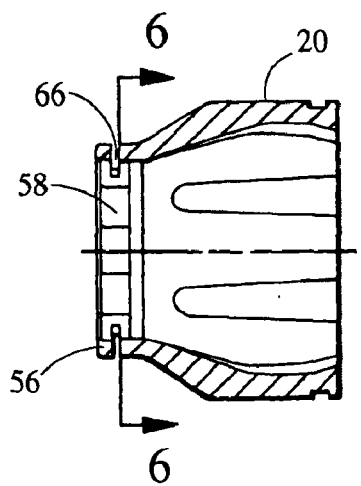
FIG. 5 is a side sectional view of a bell housing of the wheel end assembly.
Figure 6:
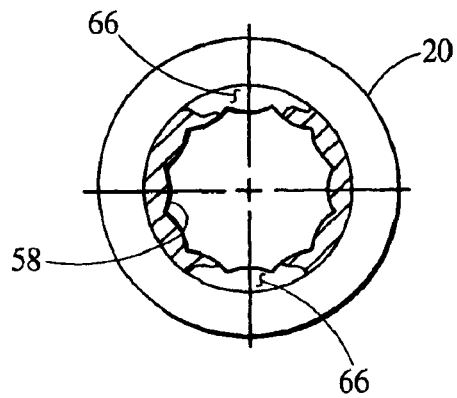
FIG. 6 is a sectional view taken along line 6—6 of FIG. 5.
Figure 7:
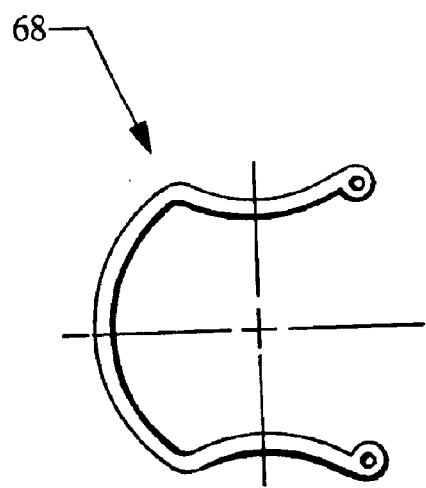
FIG. 7 is a top view of a retaining clip.
Figure 8:
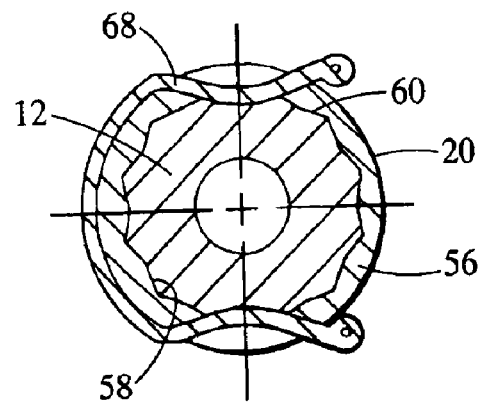
FIG. 8 is a sectional view taken along line 8—8 of FIG. 1.

Referring to FIG. 1, a notch 64 extends circumferentially around a portion of the polygon shaped outer surface 60 of the bearing shaft 12. As shown, the notch 64 includes two curved grooves cut into the polygon shaped outer surface 60 of the bearing shaft 12 and located approximately one hundred and eighty degrees apart. Referring to FIGS. 5 and 6, the bell housing 54 includes at least one window 66 formed within the narrowed neck 56. As shown, the bell housing 54 includes two curved windows 66 located approximately one hundred and eighty degrees apart and corresponding to the curved grooves of the notch 64. A retaining clip 68, shown in FIG. 7, is inserted through the windows 66 and engages the notch 64 to secure the bell housing 54 to the bearing shaft 12, as shown in FIG. 8. To remove the bell housing 54 from the bearing shaft 12, the retaining clip 68 must be removed.

Figure 9:
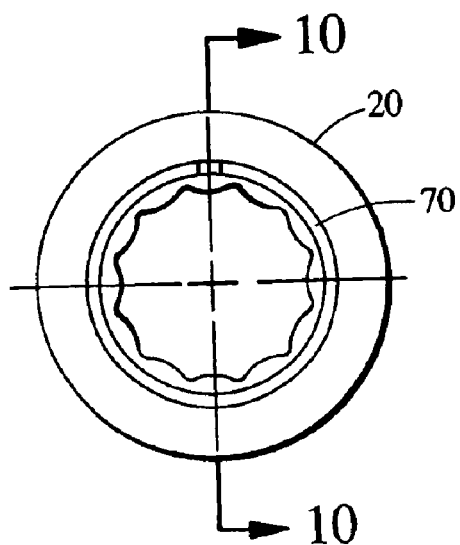
FIG. 9 is an end view of an alternative bell housing.
Figure 10:
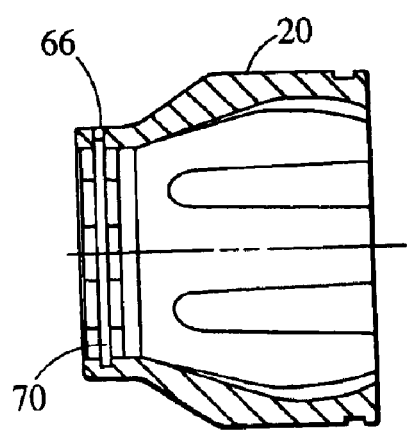
FIG. 10 is a sectional view of the bell housing shown in FIG. 9 taken along line 10—10 of FIG. 9.
Figure 11:
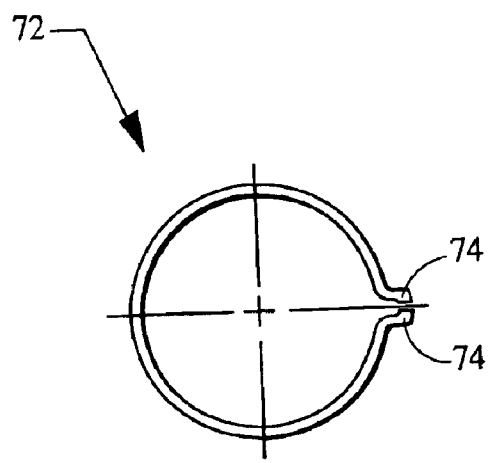
FIG. 11 is a top view of a retaining ring.
Figure 12:
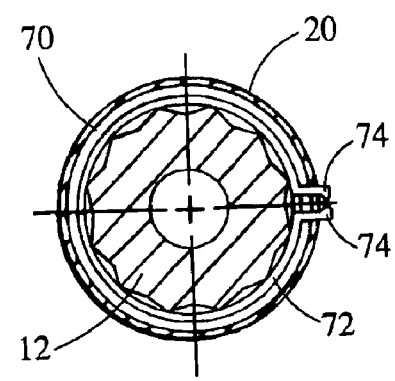
FIG. 12 is a sectional view similar to FIG. 8 of a wheel end assembly incorporating the bell housing and retaining ring shown in FIGS. 9, 10, and 11.

Alternatively, the bell housing 54 can include a groove 70 extending around the bell housing inner surface 58, as shown in FIGS. 9 and 10. A retaining ring 72, shown in FIG. 11, is positioned within the groove 70 within the bell housing 54 and engages the groove 70 and the notch 64 of the bearing shaft 12 to secure the bell housing 54 to the bearing shaft 12, as shown in FIG. 12. To remove the bell housing 54 from the bearing shaft 12, tangs 74 on the retaining ring 72 must be spread apart, such that the retaining ring 72 opens to a diameter larger than the notch 64 of the bearing shaft 12. This allows the retaining ring 72 to clear the notch 64 so the bell housing 54 can be removed.

Figure 4:
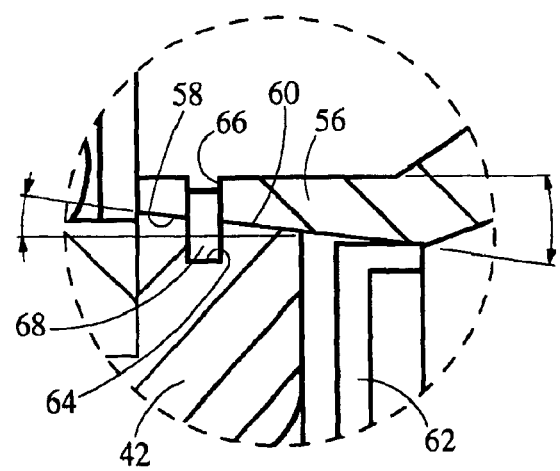
FIG. 4 is an enlarged view of a portion of FIG. 1 enclosed within circle 4 shown in FIG. 1.

Additionally, the polygonal shaped bell housing inner surface 58 and the polygonal shaped outer surface 60 of the bearing shaft 12 may be tapered at an angle along a longitudinal axis of the wheel end assembly 10, as shown in FIG. 4. A tapered connection between the bell housing 54 and the bearing shaft 12 allows for a secure connection and reduces backlash between the two components.

Figure 13:
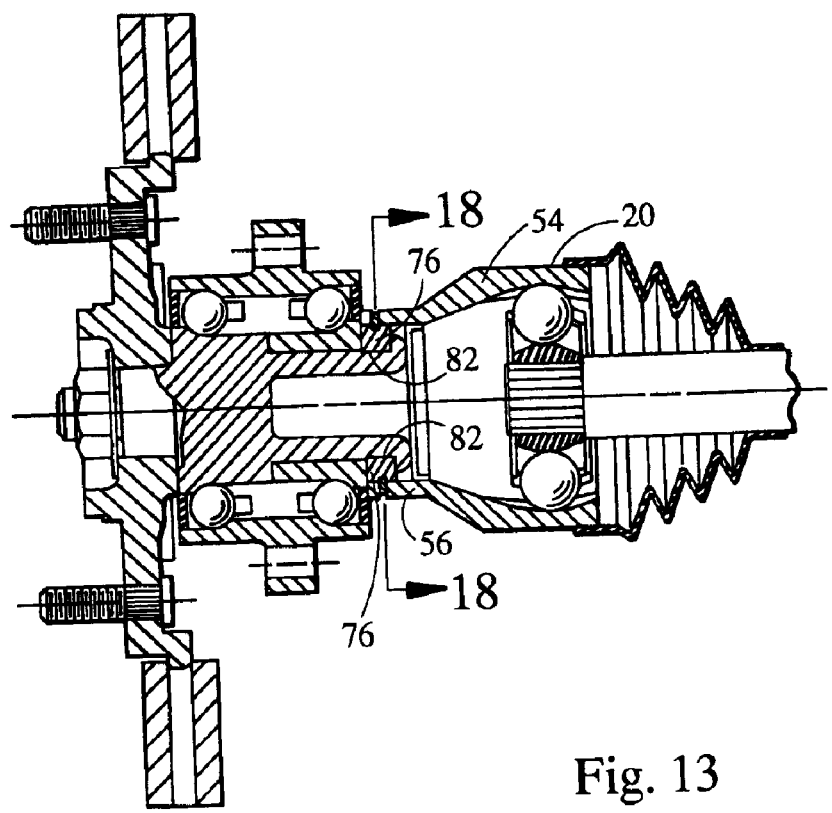
FIG. 13 is a side sectional view of an alternate embodiment of the wheel end assembly.
Figure 18:
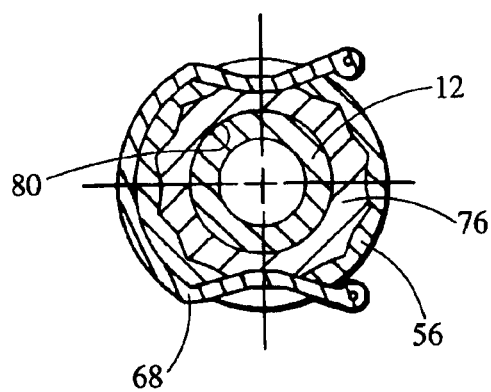
FIG. 18 is a sectional view taken along line 18—18 of FIG. 3.

Referring to FIGS. 13, 14, and 15 the bearing shaft 12 can also include a ring 76 mounted thereon. The ring 76 is positioned between the wheel bearing 26 and the flange portion 42 of the bearing shaft 12 and presents an outer surface 78. The flange portion 42 of the bearing shaft 12 secures the ring 76 onto the bearing shaft 12. The outer surface 78 of the ring 76 is polygonal shaped and corresponds to the polygonal shape of the bell housing inner surface 58, such that the bell housing inner diameter 58 engages the outer diameter 78 of the ring 76 to rotationally lock the bell housing 54 to the bearing shaft 12.

The polygonal shaped bell housing inner diameter 58 and the polygonal shaped outer diameter 78 of the ring 76 may be tapered at an angle along a longitudinal axis of the wheel end assembly 10. A tapered connection between the bell housing 54 and the ring 76 allows for a secure connection and reduces the backlash between the two components.

As shown, the ring 76 includes a splined inner diameter 80 and the bearing shaft 12 includes a splined outer diameter 82. The spline of the ring 76 engages the spline of the bearing shaft 12 such that the ring 76 is rotationally locked onto the bearing shaft 12. Alternatively, the spline can be absent from the bearing shaft 12 wherein the spline of the inner diameter 80 of the ring 76 is press fit onto the outer diameter 82 of the bearing shaft 12, thereby rotationally locking the ring 76 onto the bearing shaft 12.

The ring 76 includes an inboard face 84 and the flange portion 42 of the bearing shaft 12 engages the inboard face 84 of the ring 76. Referring to FIGS. 16 and 17, the inboard face 84 of the ring 76 may include a plurality of axial extending ridges 86. The flange portion 42 of the bearing shaft 12 engages the axially extending ridges 86 to further secure the ring 76 and rotationally lock the ring 76 onto the bearing shaft 12.

Referring to FIGS. 14 and 15, a notch 88 extends circumferentially around a portion of the polygon shaped outer surface 78 of the ring 76. The notch 88 includes two curved grooves cut into the polygon shaped outer diameter 78 of the ring 76 and located approximately one hundred and eighty degrees apart. Referring to FIGS. 5 and 6, the bell housing 54 includes at least one window 66 formed within the narrowed neck 56. As shown, the bell housing 54 includes two curved windows 66 located approximately one hundred and eighty degrees apart and corresponding to the curved grooves of the notch 88. A retaining clip 68, shown in FIG. 7, is inserted through the windows 66 and engages the radial notch 88 to secure the bell housing 54 to the ring 76 and to the bearing shaft 12, as shown in FIG. 8. To remove the bell housing 54 from the bearing shaft 12, the retaining clip 68 must be removed.

Figure 19:
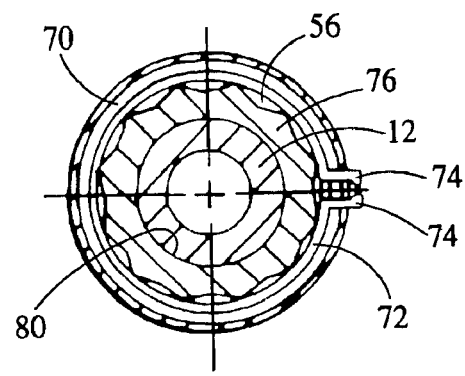
FIG. 19 is a sectional view similar to FIG. 18 of a wheel end assembly incorporating the bell housing and retaining ring shown in FIGS. 9, 10, and 11.

Alternatively, the bell housing 54 can include a groove 70 extending around the bell housing inner surface 58, as shown in FIGS. 9 and 10. A retaining ring 72, shown in FIG. 11, is positioned within the groove 70 within the bell housing 54 and engages the groove 70 and the notch 88 of the ring 76 to secure the bell housing 54 to the bearing shaft 12, as shown in FIG. 19. To remove the bell housing 54 from the bearing shaft 12; tangs 74 on the retaining ring 72 must be spread apart, such that the retaining ring 72 opens to a diameter larger than the notch 88 of the ring 76. This allows the retaining ring 72 to clear the notch 88 so the bell housing 54 can be removed.

The foregoing discussion discloses and describes the preferred embodiments of the invention. These embodiments have been described in an illustrative manner, and it is to be understood that the terminology which has been used is intended to be in the nature of words of description rather than of limitation. One skilled in the art will readily recognize from such discussion, and from the accompanying drawings and claims, that changes and modifications can be made without departing from the scope of the invention as defined in the following claims.

We claim:

1. A wheel end assembly comprising:
    a bearing shaft having an inboard end and an outboard end;
    a wheel hub mounted onto said outboard end of said bearing shaft;
    a detachable outboard joint mounted onto said inboard end of said bearing shaft; and
    a wheel bearing mounted onto said bearing shaft between said inboard end and said outboard end;
    said inboard end of said bearing shaft including a flange portion, said flange portion providing a support to keep said wheel bearing positioned onto said bearing shaft and to induce a pre-load into said wheel bearing such that said pre-load is maintained on said wheel bearing when said outboard joint is removed from said wheel end assembly;
    said outboard joint including a bell housing, said bell housing having a narrowed neck portion defining a bell housing inner surface, said bell housing inner surface having a polygon shape, said bearing shaft presenting an outer surface at said inboard end, said outer surface of said bearing shaft presenting a polygon shape corresponding to said polygon shaped bell housing inner surface such that said bell housing engages said bearing shaft and rotationaly locks said bell housing and said bearing shaft to one another;
    said polygonal shaped bell housing inner surface and said polygonal shaped outer surface of said bearing shaft being tapered along a longitudinal axis of said wheel end assembly.

2. The wheel end assembly of claim 1 wherein said wheel bearing comprises:
    a knuckle flange adapted to connect said wheel end assembly to a vehicle, said knuckle flange having an inner diameter that defines an inboard outer race and an outboard outer race;
    an inboard inner race and an outboard inner race supported on said bearing shaft; and
    a plurality of bearing elements, a first portion of said bearing elements being positioned between said inboard outer race and said inboard inner race and a second portion of said bearing elements being positioned between said outboard outer race and said outboard inner race;
    said flange portion of said bearing shaft engaging said inboard inner race to support said wheel bearing and to induce a pre-load into said wheel bearing.

3. The wheel end assembly of claim 2 wherein said outboard inner race is integrally formed within the bearing shaft.

4. The wheel end assembly of claim 2 wherein said wheel hub includes a brake rotor having a braking ring, said braking ring and said brake rotor being integrally formed with one another.

5. The wheel end assembly of claim 2 wherein said wheel hub and said bearing shaft are integrally formed with one another.

6. A wheel end assembly comprising:
    a bearing shaft having an inboard end and an outboard end;
    a wheel hub mounted onto said outboard end of said bearing shaft;
    a detachable outboard joint mounted onto said inboard end of said bearing shaft;
    a wheel bearing mounted onto said bearing shaft between said inboard end and said outboard end;
    said inboard end of said bearing shaft including a flange portion, said flange portion providing a support to keep said wheel bearing positioned onto said bearing shaft and to induce a pre-load into said wheel bearing such that said pre-load is maintained on said wheel bearing when said outboard joint is removed from said wheel end assembly;
    said outboard joint including a bell housing, said bell housing having a narrowed neck portion defining a bell housing inner surface, said bell housing inner surface having a polygon shape, said bearing shaft presenting an outer surface at said inboard end, said outer surface of said bearing shaft presenting a polygon shape corresponding to said polygon shaped bell housing inner surface such that said bell housing engages said bearing shaft and rotationally locks said bell housing and said bearing shaft to one another;

said polygon shaped outer surface of said bearing shaft being formed within said flange portion of said bearing shaft; and a notch extending circumferentially around a portion of said polygon shaped outer surface of said bearing shaft, said bell housing including at least one window formed within said narrowed neck, said wheel end assembly further including a retaining clip inserted through said at least one window and engaging said notch of said bearing shaft to secure said bell housing to said bearing shaft.

7. A wheel end assembly comprising:

a bearing shaft having an inboard end and an outboard end;

a wheel hub mounted onto said outboard end of said bearing shaft;

a detachable outboard joint mounted onto said inboard end of said bearing shaft;

a wheel bearing mounted onto said bearing shaft between said inboard end and said outboard end;

said inboard end of said bearing shaft including a flange portion, said flange portion providing a support to keep said wheel bearing positioned onto said bearing shaft and to induce a pre-load into said wheel bearing such that said pre-load is maintained on said wheel bearing when said outboard joint is removed from said wheel end assembly;

said outboard joint including a bell housing, said bell housing having a narrowed neck portion defining a bell housing inner surface, said bell housing inner surface having a polygon shape, said bearing shaft presenting an outer surface at said inboard end, said outer surface of said bearing shaft presenting a polygon shape corresponding to said polygon shaped bell housing inner surface such that said bell housing engages said bearing shaft and rotationally locks said bell housing and said bearing shaft to one another;

said bearing shaft including a ring mounted thereon, said ring positioned between said wheel bearing and said flange portion of said bearing shaft and presenting an outer surface, said polygon shaped outer surface of said bearing shaft being formed in said outer surface of said ring; and a notch extending circumferentially around a portion of said polygon shaped outer surface of said ring, said bell housing including at least one window formed within said narrowed neck, said wheel end assembly further including a retaining clip inserted through said at least one window and engaging said notch of said ring to secure said bell housing to said bearing shaft.

8. The wheel end assembly of claim 7 wherein said ring includes a splined inner diameter and said bearing shaft includes a splined outer diameter, said spline of said ring engaging said spline of said bearing shaft such that said ring is rotationally locked onto said bearing shaft.

9. A wheel end assembly comprising:

a bearing shaft having an inboard end and an outboard end;

a wheel hub mounted onto said outboard end of said bearing shaft;

a detachable outboard joint mounted onto said inboard end of said bearing shaft; and a wheel bearing mounted onto said bearing shaft between said inboard end and said outboard end;

said inboard end of said bearing shaft including a flange portion, said flange portion providing a support to keep said wheel bearing positioned onto said bearing shaft and to induce a pre-load into said wheel bearing such that said pre-load is maintained on said wheel bearing when said outboard joint is removed from said wheel end assembly;

said outboard joint including a bell housing, said bell housing having a narrowed neck portion defining a bell housing inner surface, said bell housing inner surface having a polygon shape, said bearing shaft presenting an outer surface at said inboard end, said outer surface of said bearing shaft presenting a polygon shape corresponding to said polygon shaped bell housing inner surface such that said bell housing engages said bearing shaft and rotationally locks said bell housing and said bearing shaft to one another;

said bearing shaft including a ring mounted thereon, said ring positioned between said wheel bearing and said flange portion of said bearing shaft and presenting an outer surface, said polygon shaped outer surface of said bearing shaft being formed in said outer surface of said ring;

said ring including an inboard face having a plurality of axial extending ridges, said flange portion of said bearing shaft engaging said axially extending ridges such that said ring is rotationally locked onto said bearing shaft.

10. The wheel end assembly of claim 9 wherein a notch extends circumferentially around a portion of said polygon shaped outer diameter of said ring, and a groove extends around said bell housing inner diameter, said wheel end assembly further including a retaining ring positioned within said groove within said bell housing, said retaining ring engaging said groove and said notch of said ring to secure said bell housing to said bearing shaft.

11. A wheel end assembly comprising:

a bearing shaft having an inboard end and an outboard end;

a wheel hub mounted onto said outboard end of said bearing shaft;

a wheel bearing mounted onto said bearing shaft between said inboard end and said outboard end, said inboard end of said bearing shaft including a flange portion, said flange portion providing a support to keep said wheel bearing positioned onto said bearing shaft and to induce a pre-load into said wheel bearing; and a detachable outboard joint mounted onto said inboard end of said bearing shaft, said outboard joint including a bell housing, said bell housing having a narrowed neck portion defining a bell housing inner surface, said bell housing inner surface having a polygon shape and being axially tapered along a longitudinal axis of the wheel end assembly, said flange portion of said bearing shaft presenting an outer surface having a polygon shape and an axial taper corresponding to said polygon shaped bell housing inner surface such that said bell housing engages said flange portion of said bearing shaft and rotationally looks said bell housing and said bearing shaft to one another.

12. The wheel end assembly of claim 11 wherein said wheel bearing comprises:

a knuckle flange adapted to connect said wheel end assembly within a vehicle, said flange having an inner diameter that defines an inboard outer race and an outboard outer race;

an inboard inner race and an outboard inner race supported on said bearing shaft; and a plurality of bearing elements, a first portion of said bearing elements being positioned between said inboard outer race and said inboard inner race and a second portion of said bearing elements being positioned between said outboard outer race and said outboard inner race;

said flange portion of said bearing shaft engaging said inboard inner race to support said wheel bearing and to induce a pre-load into said wheel bearing.

13. The wheel end assembly of claim 12 wherein said outboard inner race is defined by an outer surface of said bearing shaft.

14. The wheel end assembly of claim 12 wherein said wheel hub includes a brake rotor having a braking ring, said braking ring and said brake rotor being integrally formed with one another.

15. The wheel end assembly of claim 12 wherein said wheel hub and said bearing shaft are integrally formed with one another.

16. The wheel end assembly of claim 11 wherein a notch extends circumferentially around a portion of said polygon shaped outer surface of said flange portion of said bearing shaft, and said bell housing of said outboard joint includes at least one window formed within said narrowed neck, said wheel end assembly further including a retaining clip inserted through said at least one window and engaging said notch of said bearing shaft to secure said bell housing to said bearing shaft.

17. The wheel end assembly of claim 11 wherein a notch extends circumferentially around a portion of said polygon shaped outer surface of said flange portion of said bearing shaft, and a groove extends around said bell housing inner surface, said wheel end assembly further including a retaining ring positioned within said groove within said bell housing, said retaining ring engaging said groove and said notch of said flange portion of said bearing shaft to secure said bell housing to said bearing shaft.

18. A wheel end assembly comprising:

a bearing shaft having an inboard end and an outboard end;

a wheel hub mounted onto said outboard end of said bearing shaft;

a wheel bearing mounted onto said bearing shaft between said inboard end and said outboard end, said inboard end of said bearing shaft including a flange portion, said flange portion providing a support to keep said wheel bearing positioned onto said bearing shaft and to induce a pre-load into said wheel bearing;

a ring mounted onto said bearing shaft between said wheel bearing and said flange portion, said ring being rotationally locked to said bearing shaft; and a detachable outboard joint mounted onto said inboard end of said bearing shaft, said outboard joint including a bell housing, said bell housing having a narrowed neck portion defining a bell housing inner surface, said bell housing inner surface having a polygon shape and being axially tapered along a longitudinal axis of said wheel end assembly, said ring presenting an outer surface having a polygon shape and an axial taper corresponding to said polygon shaped bell housing inner surface such that said bell housing engages said ring and rotationally locks said bell housing and said ring to one another.

19. The wheel end assembly of claim 18 wherein said wheel bearing comprises:

a knuckle flange adapted to connect said wheel end assembly within a vehicle, said flange having an inner diameter that defines an inboard outer race and an outboard outer race;

an inboard inner race and an outboard inner race supported on said bearing shaft; and a plurality of bearing elements, a first portion of said bearing elements being positioned between said inboard outer race and said inboard inner race and a second portion of said bearing elements being positioned between said outboard outer race and said outboard inner race;

said flange portion of said bearing shaft engaging said inboard inner race to support said wheel bearing and to induce a pre-load into said wheel bearing.

20. The wheel end assembly of claim 19 wherein said outboard inner race is defined by an outer surface of said bearing shaft.

21. The wheel end assembly of claim 19 wherein said wheel hub includes a brake rotor having a braking ring, said braking ring and said brake rotor being integrally formed with one another.

22. The wheel end assembly of claim 19 wherein said wheel hub and said bearing shaft are integrally formed with one another.

23. The wheel end assembly of claim 18 wherein a notch extends circumferentially around a portion of said polygon shaped outer surface of said ring, and said bell housing includes at least one window formed within said narrowed neck, said wheel end assembly further including a retaining clip inserted through said at least one window and engaging said notch of said ring to secure said bell housing to said bearing shaft.

24. The wheel end assembly of claim 18 wherein said ring includes a splined inner diameter and said bearing shaft includes a splined outer diameter, said spline of said ring engaging said spline of said bearing shaft such that said ring is rotationally locked onto said bearing shaft.

25. The wheel end assembly of claim 18 wherein said ring includes an inboard face having a plurality of axial extending ridges, said flange portion of said bearing shaft engaging said axially extending ridges such said ring is rotationally locked onto said bearing shaft.

26. The wheel end assembly of claim 18 wherein a notch extends circumferentially around a portion of said polygon shaped outer surface of said ring, and a groove extends around said bell housing inner surface, said wheel end assembly further including a retaining ring positioned within said groove within said bell housing, said retaining ring engaging said groove and said notch of said ring to secure said bell housing to said bearing shaft.

* * * * *

UNITED STATES PATENT AND TRADEMARK OFFICE
CERTIFICATE OF CORRECTION

| | | |
|---|---|---|
| PATENT NO. | : 6,991,380 B2 | Page 1 of 1 |
| APPLICATION NO. | : 10/670496 | |
| DATED | : January 31, 2006 | |
| INVENTOR(S) | : Hui Hugh Wang et al. | |

It is certified that error appears in the above-identified patent and that said Letters Patent is hereby corrected as shown below:

Column 8, in claim 11, line 60, after "and rotationally" delete "looks" and substitute --locks-- in its place.

Signed and Sealed this

Eleventh Day of July, 2006

JON W. DUDAS
*Director of the United States Patent and Trademark Office*